United States Patent

Itoh

[11] Patent Number: 5,898,506
[45] Date of Patent: Apr. 27, 1999

[54] FACSIMILE MACHINE FOR RECEIVING CALLER-ID INFORMATION

[75] Inventor: Shingo Itoh, Komaki, Japan

[73] Assignee: Brother Kogyo Kabushiki Kaisha, Nagoya, Japan

[21] Appl. No.: 08/654,978

[22] Filed: May 28, 1996

[30] Foreign Application Priority Data

Jun. 6, 1995 [JP] Japan .................................. 7-139209

[51] Int. Cl.$^6$ .................................................. H04N 1/00
[52] U.S. Cl. .................... 358/434; 358/440; 379/100.01; 379/142
[58] Field of Search ...................... 358/434, 436, 358/437, 438, 440, 442, 468, 407; 379/100.01, 100.05, 100.14, 100.15, 106.01, 106.06, 106.08, 106.09, 142, 127

[56] References Cited

U.S. PATENT DOCUMENTS

| | | | |
|---|---|---|---|
| 4,242,539 | 12/1980 | Hashimoto | 379/142 |
| 4,551,581 | 11/1985 | Doughty | 379/93.14 |
| 4,582,956 | 4/1986 | Doughty . | |
| 4,584,434 | 4/1986 | Hashimoto | 379/142 |
| 5,121,423 | 6/1992 | Morihiro et al. | 379/245 |
| 5,315,650 | 5/1994 | Smith et al. | 379/142 |
| 5,341,411 | 8/1994 | Hashimoto | 379/142 |
| 5,517,557 | 5/1996 | Tanaka | 379/142 |

FOREIGN PATENT DOCUMENTS

B2-3-74865  11/1991  Japan .

*Primary Examiner*—Edward L. Coles
*Assistant Examiner*—Madeleine Av Nguyen
*Attorney, Agent, or Firm*—Oliff & Berridge, PLC

[57] ABSTRACT

A facsimile machine capable of receiving input of data from a switchboard over a telephone circuit during a silent interval between a first ring signal and a second ring signal, and including a network control unit NCU for detecting the first ring signal; a clock for starting measurement of a predetermined duration of time when the NCU detects the first ring signal and stopping measurement of the predetermined duration of time between an end of the data and a beginning of the second ring signal; and a CPU for causing the NCU to close a telephone circuit when the clock stops measurement of the predetermined duration of time.

14 Claims, 5 Drawing Sheets

FACSIMILE MACHINE FOR RECEIVING CALLER-ID INFORMATION

BACKGROUND OF THE INVENTION

1. Field of the Invention

The present invention relates to a facsimile machine capable of receiving information service data called caller-ID inputted over a telephone circuit from a switchboard during a silent interval between a first ring signal and a second ring signal.

2. Description of the Related Art

There has been known a service provided by switchboards called caller-ID information service. A caller-ID is inputted over a telephone from a switchboard to a terminal circuit during a silent interval between a first ring signal and a second ring signal. The caller-ID includes various data including, depending on the country and the switchboard service, the date, the telephone number of the caller, the telephone number of the ring recipient, the type of ring, the caller's name, and the condition of the network system.

U.S. Pat. No. 4,582,956 describes a facsimile machine capable of receiving caller-ID data. In order to receive the caller-ID data, the modulation format of the modem must match that of the caller-ID data. The modulation format of the caller-ID data is FSK (frequency-shift keying). To match the modulation formats, the modem detects a single frequency signal added directly in front of the caller-ID data. In this way, detection of the single frequency signal acts as a trigger to start reception of the caller-ID data.

SUMMARY OF THE INVENTION

However, when the facsimile machine is set to pick up after generation of only a single ringing, the telephone circuit will be closed directly after the end of the first call signal. Therefore, reception of the caller-ID data is impossible when the facsimile machine is set to pick up after generation of only a single ringing.

It is an objective of the present invention to overcome the above-described problem and to provide a facsimile machine capable of receiving caller-ID data even when the facsimile machine is set to pick up after generation of only a single ringing.

To achieve the above-described objective, a facsimile machine according to the present invention is a facsimile machine capable of receiving input of data from a switchboard over a telephone circuit during a silent interval between a first ring signal and a second ring signal, and the facsimile machine includes ring signal detection means for detecting the first ring signal: clock means starting measurement of a predetermined duration of time when the ring signal detection means detects the first ring signal and stopping measurement of the predetermined duration of time between an end of the data and a beginning of the second ring signal; and telephone circuit closure means for closing a telephone circuit when the clock means stops measurement of the predetermined duration of time.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
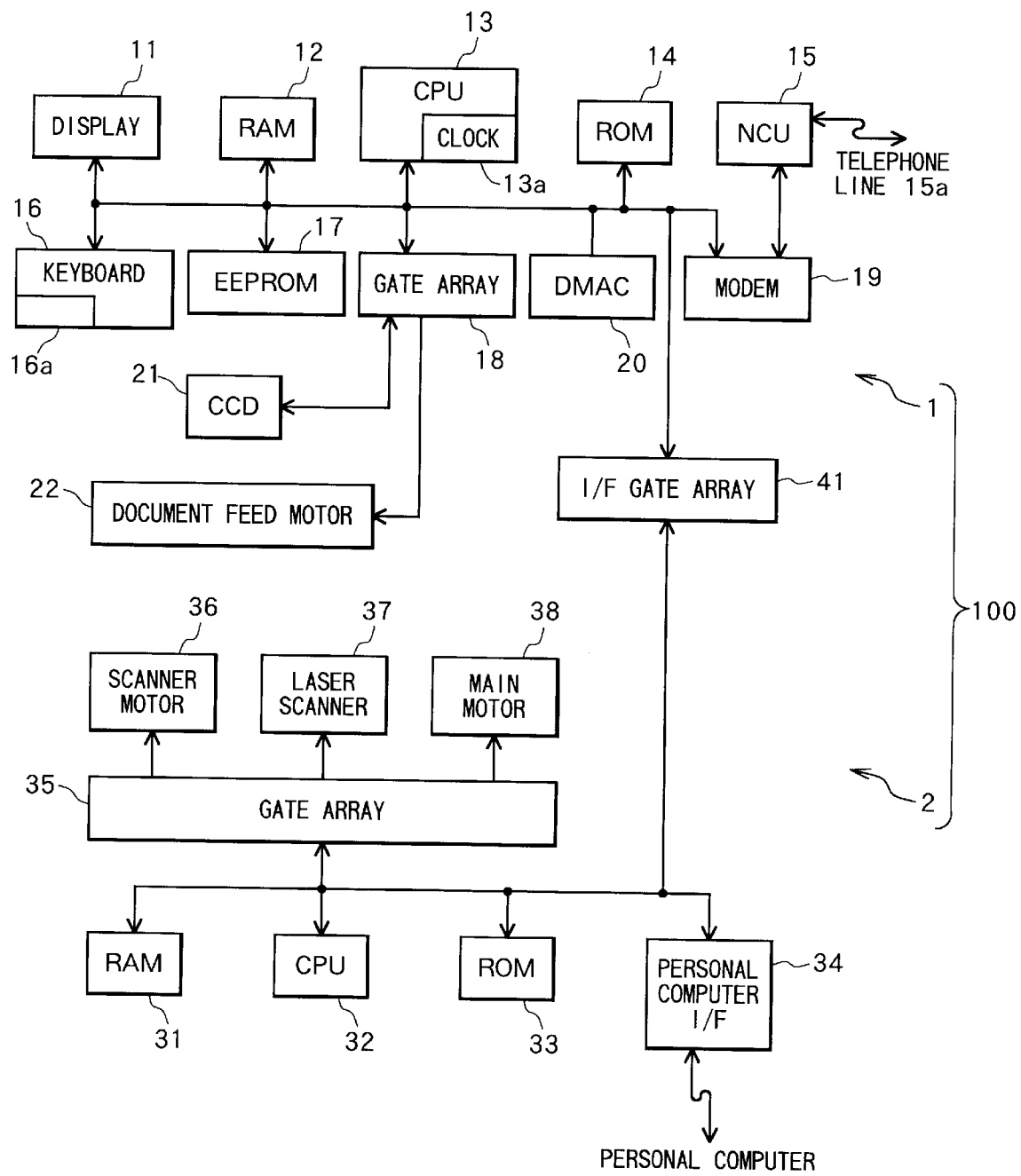
FIG. 1 is block diagram showing essential components of a facsimile machine according to an embodiment of the present invention.

A facsimile machine according to a preferred embodiment of the present invention will be described while referring to the accompanying drawings wherein like parts and components are designated by the same reference numerals to avoid duplicating description.

FIG. 1 is a block diagram showing electronic circuitry of a facsimile machine 100 according to the present embodiment. The facsimile machine 100 includes a facsimile portion 1 and a printer portion 2. The facsimile portion 1 includes a display 11, such as a liquid crystal display (LCD), disposed on an operation panel (not shown) and for displaying time and the like; a RAM 12 for storing a variety of data; a CPU 13 for performing overall control operations of the facsimile machine 100; a ROM 14 for storing a variety of programs executed by the CPU 13; a network control unit (NCU) 15 connected to a telephone circuit 15a and for performing network control; a keyboard 16 disposed on the operation panel and for outputting signals according to operations by a user; an EEPROM 17 for storing certain flags and a telephone book including shortened dialing numbers and names of frequently called parties; a gate array 18; a modem 19 for modulating signals to be transmitted and demodulating received signals; and a direct memory access control (DMAC) 20 for transmitting data directly from the RAM 12. A charge coupled device (CCD) 21 for reading images from documents and a document feed motor 22 for transporting documents at a predetermined pitch are connected to the gate array 18. A ring number setting switch 16a is provided to the keyboard 16. With the ring number setting switch 16a, a user can set the number of times a ringing circuit (not shown) generates a ringing tone before the facsimile machine 100 picks up, that is, before the NCU 15 closes the telephone circuit 15a.

The NCU 15 is also capable of detecting the end edge of a first incoming ring signal. The CPU 13 is provided with a clock 13a which starts measuring a predetermined duration of time when the NCU 15 detects the end edge of a first ring signal and stops measurement between the end edge of caller-ID data and the lead edge of a second ring signal. The CPU 13 is also capable of controlling the NCU 15 to close the telephone circuit 15a at the time the clock 13a stops measuring the predetermined duration of time when the facsimile machine 100 has been set, using the ring number setting switch 16a, to pick up after generation of only a single ringing tone.

The printer portion 2 includes a RAM 31 for storing a variety of data; a CPU 32 for performing overall control operations of the printer portion 2; a ROM 33 for storing a variety of programs and character patterns; a computer interface 34 for connecting the facsimile machine to an external computer (not shown); and a printer gate array 35.

A scanner motor 36, laser scanner 37, and a main motor 38, among other components, are connected to the gate array 35. The laser scanner 37 is driven by the scanner motor 36 to scan a laser beam for recording. The main motor 38 is for driving transport of recording sheets and agitation of toner, among other operations. The facsimile portion 1 and the printer portion 2 are connected via an interface gate array 41.

Figure 2:
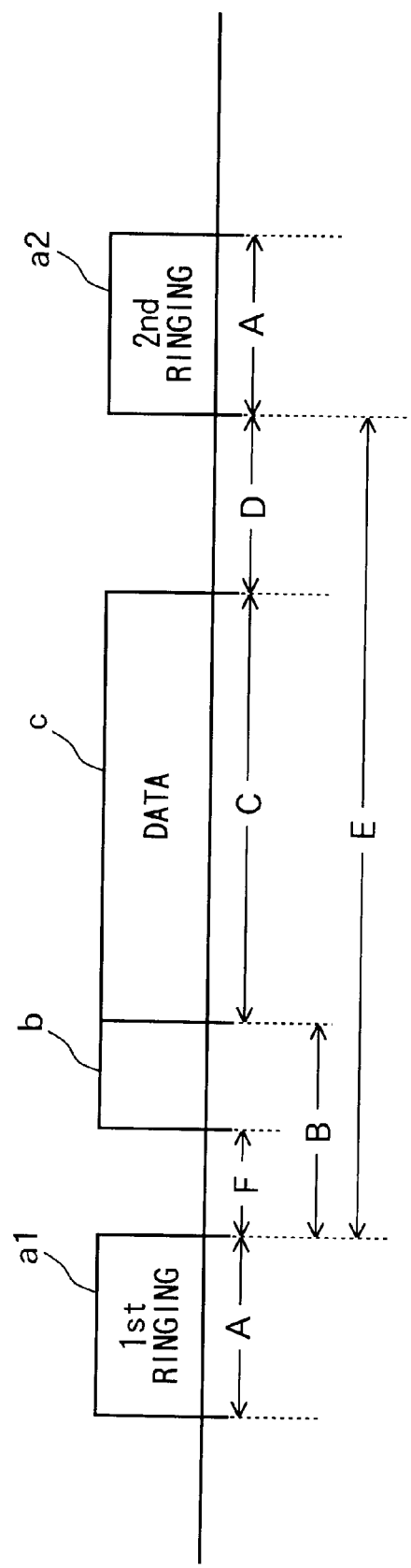
FIG. 2 is a time chart showing timing of various signals transmitted over a telephone circuit when a remote device attempts to ring the facsimile machine.

FIG. 2 is a time chart showing timing of various signals transmitted over the telephone circuit 15a during ringing operations. As can be seen in FIG. 2, a single frequency signal b and caller-ID data c are transmitted between a first ring signal a1 and a second ring signal a2. The first ring signal a1 and the second ring signal a2 are obtained by, for example, superimposing a sinusoidal signal of 86 volts effective value and of 20 Hz on a 48 volt DC signal. The caller-ID data c is an FSKed signal (i.e., is a signal subjected to frequency shift keying) wherein, for example, "0" level of parallel data is conveyed at a frequency of 2025 Kz and "1" level is conveyed at 2225 Hz.

In this example, the first and second ring signals a1, a2 continue for a duration A of 2.0 seconds each. Also, an interval B of 0.5 seconds or more separates the first ring signal a1 from the caller-ID data c. The caller-ID data c continues for a duration C of between 2.9 to 3.3 seconds. The caller-ID data c and the second ring signal a2 are separated by an interval D of 0.2 seconds or more. The first ring signal a1 and the second ring signal a2 are separated by an interval E of 4.0 seconds. The first ring signal a1 and the single frequency signal b are separated by an interval F of between 0.3 and 0.35 seconds.

Figure 3:
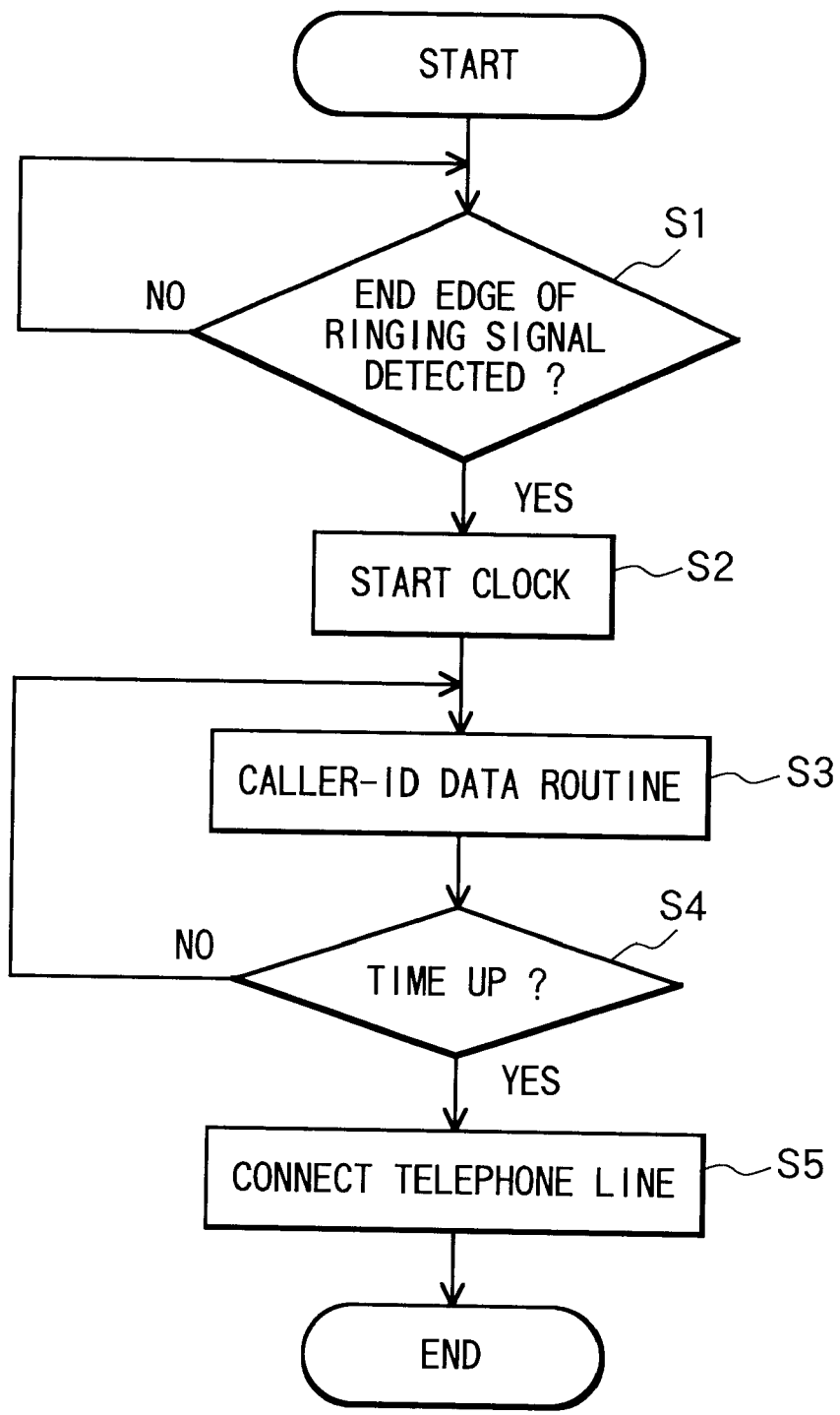
FIG. 3 is a flowchart representing operations performed in the facsimile machine during reception of caller-ID data.

Next, an explanation of processes performed in a caller-ID reception routine of the facsimile machine 100 when the ring number setting switch 16a is set so that the facsimile machine 100 picks up, that is, so that the NCU 15 closes the telephone circuit 15a, after generation of only a signal ringing tone will be provided while referring to the flowchart shown in FIG. 3.

When the first ring signal a1 is inputted from the switchboard over the telephone circuit 15a to the NCU 15 of the facsimile portion 1, then the ringing circuit (not shown) generates a ringing tone and the CPU 15 starts detection for the end edge of the first ring signal a1. Whether or not the end edge of the first ring signal a1 has been detected is determined in step 51. Hereinafter, individual steps will be referred to in the drawings and following text as Si, wherein i is the number of an individual step. When the end edge of the first ring signal a1 is detected (S1:YES), then in S2 the clock 13a of the CPU 13 starts timing a predetermined duration of time which is greater than the sum of the interval B and the duration C, but which is less than the interval E. In this example, the predetermined duration of time is 3.9 seconds. Next, when the modem 19 detects the single frequency signal b, then the modem 19 switches to a modulation format that matches the caller-ID data c and demodulates the caller-ID data c. Then in S3 the CPU 13 executes data processes on the caller-ID data. For example, the caller-ID data c is stored in the RAM 12 and predetermined information included in the caller-ID data c is displayed on the display 11. In S4 the CPU 13 determines whether or not the clock 13a has stopped measuring the predetermined duration of time. If the time duration has elapsed (S4:YES), then in S5 the CPU 13 controls the NCU 15 to close the telephone circuit 15a by operating its telephone circuit closing relay (not shown). Then the caller-ID reception routine is ended.

When it is determined in S4 that the predetermined duration of time has not elapsed (S4:NO), then the routine returns to S3, whereupon data processes performed on the caller-ID data c are continued.

When it is determined in Si that the end edge of the first ring signal a1 has not been detected (S1:NO), then the routine returns to S1 and waits until the end edge of the first ring signal a1 is detected.

In this way, the telephone circuit 15a is closed 3.9 seconds, for example, after the end edge of the first ring signal a1 is detected. Therefore, the facsimile machine 100 can receive the caller-ID data c after generating only a single ringing tone as set. That is, as shown in FIG. 2, the total of the time durations B and C between the end edge of the first ring signal a1 to the end edge of the caller-ID data c is 3.4 to 3.8 seconds. On the other hand, the time duration E between the end edge of the first ring signal a1 and the lead edge of the second ring signal a2 is 4.0 seconds. Therefore, the facsimile machine 100 can receive all of the caller-ID data c if the clock 13a is set to measure a predetermined time between 3.8 seconds and 4.0 seconds or, for example, 3.9 seconds. Also, a second ringing tone will not be generated because the CPU 13 closes the telephone circuit 15a before the second ring signal a2 is inputted.

Also, because the NCU 15 detects the end edge of the first ring signal a1, the clock time measured by the clock 13a of the CPU 13 is shorter than if the front edge of the first ring signal a1 were detected. The shorter the time measured, the smaller the cumulative error generated during its measurement. Therefore, the number of times problems produced by a large cumulative error can be reduced. For example, a second ringing tone will be erroneously generated less often. Also, the telephone circuit 15a is less likely to be erroneously closed during reception of the caller-ID data c because the clock 13a stops measuring the predetermined duration of time too soon.

Figure 4:
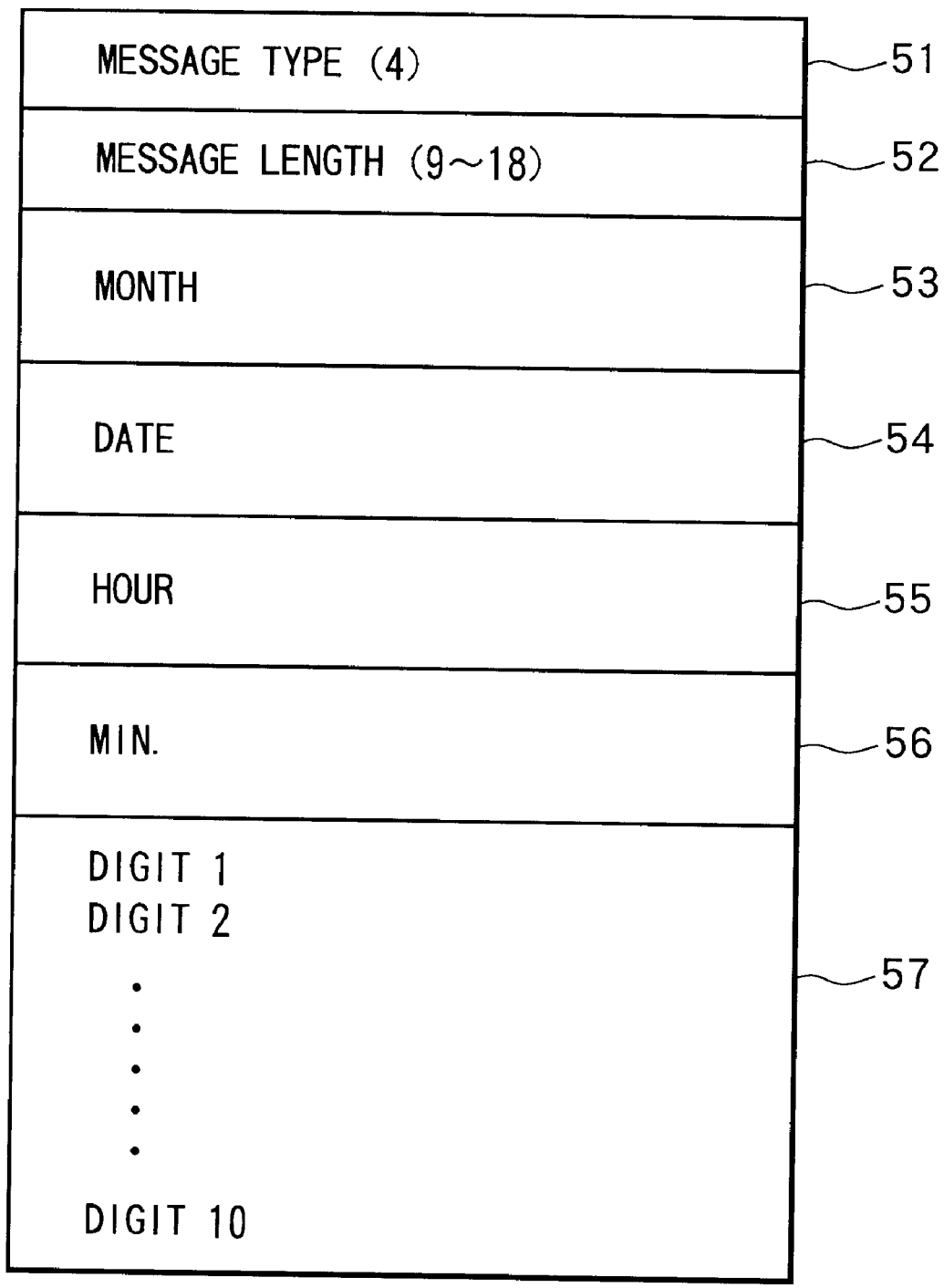
FIG. 4 is a schematic view showing format of a single data message.

The following are examples of types of caller-ID data c received and processed according to the above-described operations. FIG. 4 represents format of a single data message including regions 51 through 57. It should be noted that numbers in parenthesis in FIGS. 4 and 5 indicate a number, represented in binary code, stored in the corresponding region. For example, a region indicating (1) in the drawings stores 00000001, that is, the number one in binary code. The first region 51 of the caller-ID data represents the type of message included in the data. The region 52, which follows the region 51, represents the length of the message, that is, the number of bytes following the region 52. The number represented in binary code in the region 52 can be any one of 9 through 18, depending on the data stored in the region 57. The regions 53, 54, 55, 56 represent the present month, date, hour, and minute respectively. The regions 53 through 56 each contain two bytes of data in ASCII (American Standard Code for Information Interchange) code. The region 57 represents the actual caller-ID, that is, a variety of information related to the caller. The region 57 also contains ASCII coded data. When the region 57 is set to "P," this means that the caller's name is unlisted. When "O" is set, then the caller is calling from outside the service area of the switchboard exchange to which the facsimile machine 100 is connected.

Figure 5:
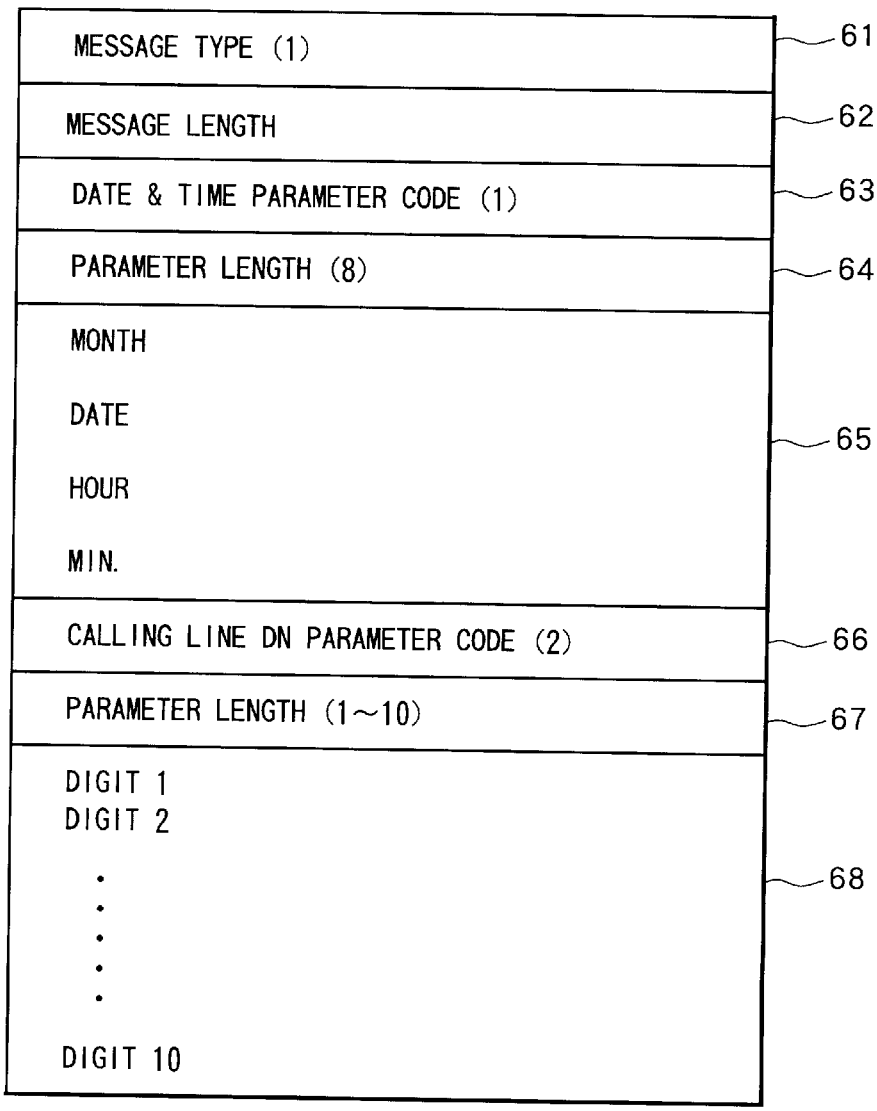
FIG. 5 is a schematic view showing format of a multiple data message.

FIG. 5 shows a format of a multiple data message including regions 61 through 68. The first region 61 of the caller-ID data represents the type of message included in the data. The region 62 represents the length of the message, that is, the number of bytes following region 62. The region 63 indicates by binary parameter code that the following data relates to the time and date. Without this information, the facsimile machine 100 will be unable to perform reception properly. Messages not following this format will be discarded. The region 64 represents the length of the time and data parameter. The region 65 represents in ASCII code the present month, date, hour, and minute. The region 66 includes a calling line directory number (DN) that indicates in binary parameter code that the following data is caller-ID data, that is, a variety of information relating to the caller. The region 67 indicates the length of the parameter. The region 68 represents in ASCII code the caller-ID, that is, a variety of information on the caller.

Figure 6:
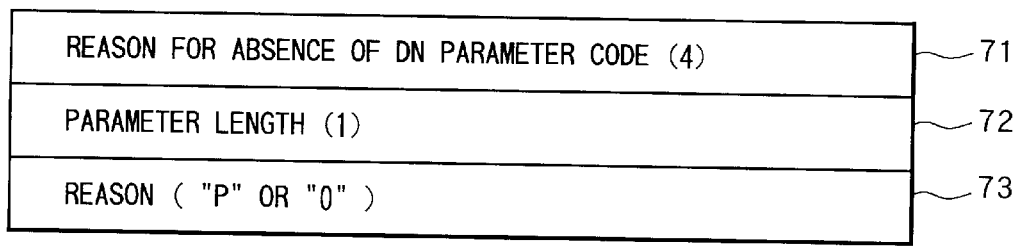
FIG. 6 is schematic view showing an alternative for a portion of the multiple data message format shown in FIG. 5.

When no data exists in the region 66, then the switchboard transmits regions 71 through 73 shown in FIG. 6 instead of the data in regions 67 and 68, that is, instead of the data subsequent to region 66 in FIG. 5. The region 71 stores in binary code a parameter representing that subsequent data indicates the reason why no caller-ID is present. The region 72 represents the message length of the parameter. The region 73 represents the reason why there is no caller-ID as either "P" or "O." When the caller's name is unlisted, then the reason will be "P." When the caller is outside the service area of the switchboard exchange of the facsimile machine 100, then the reason will be "O."

While the invention has been described in detail with reference to specific embodiments thereof, it would be apparent to those skilled in the art that various changes and modifications may be made therein without departing from the spirit of the invention, the scope of which is defined by the attached claims.

For example, although in the above-described embodiment the NCU 15 detects the end edge of the first ring signal a1, the NCU 15 could be designed to detect the lead edge of the first ring signal a1. In this case, the clock 13a in the CPU 13 would start measuring the predetermined duration of time as soon as the NCU 15 detects the lead edge of the first ring signal a1. The predetermined duration of time itself would be set to an appropriate value so that as described above the clock 13a would stop measuring the predetermined duration of time at a point between the end edge of the caller-ID data c and the lead edge of the second ring signal a2.

Also, in the above-described embodiment, when the modem 19 detects the single frequency signal b, the single frequency signal b acts as a trigger signal to cause the modem 19 to switch its modulation format. However, the modem 19 could be designed to detect either the lead edge or the end edge of the first ring signal a1 so that either of these serves as a trigger signal to switch the modulation format of the modem 19. Such a modification would ensure good reception of the caller-ID data c even under conditions, such as when the connection of the telephone circuit 15a is poor or when a great deal of static is present, which are unfavorable for detection of the single frequency signal b.

In the embodiment, the number of times a ringing tone is generated is set using a ring number setting switch 16a. However, a special switch for setting the number of ringing tones need not be provided to the keyboard 16. Instead, the number of ringing tones can be set using a software-generated menu screen or by pressing a combination of keys on the keyboard 16.

As is clear from the above description, according to the present invention, when the NCU 15 detects a first ring signal, the clock 13a of the CPU 13 starts measuring a predetermined duration of time. The clock 13a stops measuring the predetermined duration of time at a point between the end edge of data and the lead edge of the second ring signal. Then, when the ring number setting switch 16a is set so that the facsimile machine picks up after the ringing circuit (not shown) generates a single ringing tone, the CPU 13 closes the telephone circuit 15a when the clock 13a completes measurement of the predetermined duration of time. Therefore, the CPU 13 will not close the telephone circuit 15a during the time starting with input of the first ring signal and stopping when the clock 13a measures that the predetermined duration of time has elapsed. As a result, by setting timing of measurement of the predetermined duration of time to stop at a point between the end edge of the caller-ID data and the lead edge of the second ring signal, then all caller-ID data can be properly received even when the ring number setting switch 16a is set so that the facsimile machine picks up after the ringing circuit generates a single ringing tone. Also, only a single ringing tone will be generated as set using the ring number setting switch 16a of the facsimile machine.

When the NCU 15 is designed to detect the end edge of the first ring signal, then the predetermined duration of time that the clock 13a must measure is shortened, thereby reducing cumulative error of time measurement operations. This will in turn reduce the possibility of the CPU 13 closing the telephone circuit 15a or generating a second ringing tone during reception of caller-ID data because the clock 13a has inaccurately measured the predetermined duration of time.

What is claimed is:

1. A facsimile machine capable of receiving input of data from a switchboard over a telephone circuit during a silent interval between a first ring and a second ring signal, wherein the first ring signal is an initial ring signal of an incoming transmission and the second ring signal is the next ring signal of the incoming transmission after the first ring signal the facsimile machine comprising:

ring signal detection means for detecting the first ring signal;

clock means for starting measurement of a predetermined duration of time when the ring signal detection means detects the first ring signal and stopping measurement of a predetermined duration of time between an end of the input data and a beginning of the second ring signal; and telephone circuit closure means for closing a telephone circuit when the clock means stops measurement of the predetermined duration of time.

2. A facsimile machine as claimed in claim 1, further comprising:

ring number setting means for setting a number of times a ringing tone is generated before the telephone circuit closure means closes the telephone circuit; and wherein the telephone circuit closure means closes the telephone circuit when the clock means stops measurement of the predetermined duration of time only when the ring number setting means sets the number of times to one ringing tone.

3. A facsimile machine as claimed in claim 2, further comprising:

a modem capable of demodulating in more than one format and of detecting a trigger signal, the modem capable of switching modulation format to enable demodulating of caller-ID data upon detecting the trigger.

4. A facsimile machine as claimed in claim 3, wherein the modem switches modulation format to enable demodulating of caller-ID data upon detecting a single frequency signal, which serves as the trigger.

5. A facsimile machine as claimed in claim 3, wherein the modem switches modulation format to enable demodulating of caller-ID data upon detecting a lead edge of the first ring signal, the lead edge serving as the trigger.

6. A facsimile machine as claimed in claim 3, wherein the modem switches modulation format to enable demodulating of caller-ID data upon detecting an end edge of the first ring signal, the end edge serving as the trigger.

7. A facsimile machine as claimed in claim 1, further comprising:

a modem capable of demodulating in more than one format and of detecting a trigger signal, the modem capable of switching modulation format to enable demodulating of caller-ID data upon detecting the trigger.

8. A facsimile machine as claimed in claim 7, wherein the modem switches modulation format to enable demodulating of caller-ID data upon detecting a single frequency signal, which serves as the trigger.

9. A facsimile machine as claimed in claim 7, wherein the modem switches modulation format to enable demodulating of caller-ID data upon detecting a lead edge of the first ring signal, the lead edge serving as the trigger.

10. A facsimile machine as claimed in claim 7, wherein the modem switches modulation format to enable demodulating of caller-ID data upon detecting an end edge of the first ring signal, the end edge serving as the trigger.

11. A facsimile machine as claimed in claim 1, wherein the input data includes a single data message.

12. A facsimile machine as claimed in claim 1, wherein the input data includes a multiple data message.

13. A facsimile machine as claimed in claim 1, wherein the ring signal detection means detects a lead edge of the first ring signal.

14. A facsimile machine as claimed in claim 1, wherein the ring signal detection means detects an end edge of the first ring signal.

* * * * *